(12) United States Patent
Lee et al.

(10) Patent No.: US 11,910,124 B2
(45) Date of Patent: Feb. 20, 2024

(54) EXTERNALLY MOUNTED TEMPERATURE CALIBRATION DEVICE FOR THERMAL CAMERAS AND TEMPERATURE MEASUREMENT SYSTEM USING THE SAME

(71) Applicant: MESH Co., Ltd., Wonju-si (KR)

(72) Inventors: Jung Hoon Lee, Wonju-si (KR); Joo Sung Lee, Wonju-si (KR)

(73) Assignee: MESH CO., LTD., Wonju-si (KR)

( * ) Notice: Subject to any disclaimer, the term of this patent is extended or adjusted under 35 U.S.C. 154(b) by 79 days.

(21) Appl. No.: 17/109,511

(22) Filed: Dec. 2, 2020

(65) Prior Publication Data

US 2021/0385393 A1 Dec. 9, 2021

(30) Foreign Application Priority Data

Jun. 9, 2020 (KR) .................. 10-2020-0069909

(51) Int. Cl.
*H04N 5/33* (2023.01)
*G01J 5/10* (2006.01)
(Continued)

(52) U.S. Cl.
CPC .............. *H04N 5/33* (2013.01); *G01J 5/0025* (2013.01); *G01J 5/10* (2013.01); *G01J 5/53* (2022.01);
(Continued)

(58) Field of Classification Search
CPC .......... H04N 17/002; H04N 5/33; G06T 7/80; G06T 2207/10048
See application file for complete search history.

(56) References Cited

U.S. PATENT DOCUMENTS 4,735,676 A * 4/1988 Iwasa .................. H05K 3/4664
338/308
4,768,885 A * 9/1988 Maier .................. G01J 5/0805
425/170

(Continued)

FOREIGN PATENT DOCUMENTS

JP 2009246731 * 10/2009
JP 2019039672 * 3/2019
KR 1020150129937 A 11/2015

*Primary Examiner* — Kathleen V Nguyen
(74) *Attorney, Agent, or Firm* — Rabin & Berdo, P.C.

(57) ABSTRACT

The present invention relates to an externally mounted calibration device and a temperature measurement system using the same. The temperature measurement system calibrates the temperature of the thermal camera using an externally mounted temperature calibration device that is mounted on one side of the outside of the thermal camera unit and includes a temperature measurement substrate with a temperature sensor. The temperature measurement substrate of the externally mounted temperature calibration device is captured simultaneously with the subject to be measured on the screen of the thermal camera, and using the temperature of the temperature measurement substrate measured by the temperature sensor and the temperature of the temperature measurement substrate measured by the thermal camera, the temperature of the subject to be measured by the thermal camera is calibrated, thereby ensuring that the thermal camera always maintains a constant temperature measurement result regardless of the environmental temperature when used.

15 Claims, 9 Drawing Sheets

(51) Int. Cl.
*G06T 7/80* (2017.01)
*G01J 5/00* (2022.01)
*G01J 5/53* (2022.01)

(52) U.S. Cl.
CPC ......... *G06T 7/80* (2017.01); *G01J 2005/0077* (2013.01); *G06T 2207/10048* (2013.01)

(56) References Cited

U.S. PATENT DOCUMENTS

2013/0147966 A1* 6/2013 Kostrzewa ............... H04N 5/33
 348/164
2020/0105407 A1* 4/2020 Soreefan ............... A61B 5/1115

* cited by examiner

EXTERNALLY MOUNTED TEMPERATURE CALIBRATION DEVICE FOR THERMAL CAMERAS AND TEMPERATURE MEASUREMENT SYSTEM USING THE SAME

TECHNICAL FIELD

The present invention relates to an externally mounted calibration device and a temperature measurement system using the same. The temperature measurement system calibrates the temperature of the thermal camera using an externally mounted temperature calibration device that is mounted on one side of the outside of the thermal camera unit and includes a temperature measurement substrate with a temperature sensor. The temperature measurement substrate of the externally mounted temperature calibration device is captured simultaneously with the subject to be measured on the screen of the thermal camera, and using the temperature of the temperature measurement substrate measured by the temperature sensor and the temperature of the temperature measurement substrate measured by the thermal camera, the temperature of the subject to be measured by the thermal camera is calibrated, thereby ensuring that the thermal camera always maintains a constant temperature measurement result regardless of the environmental temperature when used.

BACKGROUND TECHNOLOGY OF THE INVENTION

Thermal cameras are cameras that can measure the surface temperature of an object without making contact. Industrial thermal cameras sometimes measure a range of temperatures ranging from hundreds to thousands of degrees, and in this case, there is no problem in achieving the purpose of use even if the temperature accuracy units are large such as several degrees or tens of degrees. Temperature accuracy is also not a major issue for thermal cameras that achieve their purpose of use by visualizing the relative temperature difference within the screen rather than temperature accuracy, such as checking insulated areas, uncovering overheated elements in a circuit, and detecting intruders or ships for military.

However, in the case of using a thermal camera for medical purposes, temperature accuracy is a very important variable in achieving the purpose of use, such as determining the presence of fever and detecting nervous system abnormalities through body temperature, so the temperature accuracy must be within 1° C. The criterion for determining high fever through fever test for a specific infectious disease is 37.3° C., and in order to compare with a person with a normal body temperature of 36.5° C., the temperature must be expressed in units of 0.1° C., and the temperature accuracy should be able to remain within 0.4° C. at room temperature. This is because if the temperature accuracy is low, febrile persons can be judged as being normal or the opposite result can occur.

Temperature calibration of a thermal camera is performed using a blackbody source (namely, blackbody furnace). The blackbody source has a circular or square shape, and the surface is made black to approach an emissivity of 1. The surface temperature of the black reference surface can be maintained as intended by the user, and it can usually be set in units of 0.1° C. or smaller. If more than two blackbody sources are used, the gain and level of the image sensor of the thermal camera can be calibrated. 'Gain' determines the range or interval of temperature, and 'level' determines the rise or fall in temperature (drift). Temperature calibration refers to setting up the measuring instrument to measure the correct value, and compensation of temperature refers to modifying the measured value to be accurately expressed as initially set by subtracting or adding the deviation to this value if an error occurs in the preset value.

Among thermal cameras, there are types that simply image and show the relative temperature difference, and there are types that are used for the purpose of accurate measurement by adding temperature information. The latter is referred to as a radiometric thermal camera, and all thermal cameras related to the present invention are radiometric thermal cameras.

Since the temperature measurement result of thermal cameras is highly dependent on the temperature of the image sensor, temperature calibration should be performed after the image sensor has been sufficiently preheated and the temperature does not change any more and reaches a stable state. Like this calibration principle, even when used in the field, the correct value can be measured only when using after the stabilization time has passed after powering on for the first time. The temperature of the image sensor converges to one temperature through equilibrium between the elevated temperature due to the heat generated in the circuit inside the camera with an image sensor and the temperature of the environment outside the camera, and therefore does not change any more, and the stabilization time is typically about 1 hour. Accordingly, the thermal camera's temperature measurement results are largely influenced by the internal circuit within 1 hour after the power is switched on, and after 1 hour, it is mainly influenced by external environmental temperature due to daily temperature difference such as air temperature change or indoor cooling and heating. Even after the stabilization time, if the temperature changes significantly, or if there is a change such as turning the power off and on, the temperature measurement results may fluctuate, so much attention is required.

The temperature measurement result has a correlation with the image sensor temperature, and it is formulated and mapped one-to-one, or formulated and compensated. To this end, there is a contact-type temperature sensor that can measure the temperature inside the thermal camera. The location of the temperature sensor differs for each manufacturer of thermal cameras, but in some cases, it is attached to the internal shutter and in other cases, it is attached to the image sensor. When calibrating the temperature of the thermal camera in a laboratory environment, that is, a constant temperature environment, the measured value of this internal temperature sensor is also saved. A thermal camera measures the value of the internal temperature sensor at regular intervals, and if it is different after comparing it with the value stored at the time of temperature calibration, it compensates the temperature measurement result by applying the previously investigated correlation value or the result value according to the formula.

Since the location of the additional temperature sensor that measures the temperature with the image sensor is located at the deepest position inside the thermal camera, in many cases, it is not possible to instantly and accurately represent the occurrence of errors caused by external temperature changes. In reality, because it is significantly affected by such factors as the range and speed of change of the outside temperature, the thermal conductivity and the contact area of the device in contact with the camera, the presence of wind and humidity, and the accuracy and reproducibility of the internal temperature sensor, it is often not possible to accurately compensate.

For this reason, the most accurate way to compensate temperature measurement results until now has been to utilize a method in which a high-precision blackbody source is placed on the surface to be measured and measured with a thermal camera at the same time as temperature calibration in a laboratory environment. However, a reliable blackbody source exceeds the price of a thermal camera, and unlike the laboratory environment, the environment actually used has many variables that can be factors of error, such as changes in temperature, changes in humidity, the presence of wind, and the presence of disrupting infrared rays, and these are significant problems in managing the equipment, so it is quite unreasonable to apply to thermal cameras.

The present invention presents an externally mounted temperature calibration device and temperature measuring system using the same. In the present invention, the temperature of the thermal camera is calibrated using an externally mounted temperature calibration device that includes a temperature measurement substrate equipped with a temperature sensor without using a blackbody source, and the temperature measurement substrate of the externally mounted temperature calibration device is captured simultaneously with the subject to be measured on the screen of the thermal camera. The temperature of the subject to be measured with a thermal camera is calibrated using the temperature of the temperature measurement substrate measured with a temperature sensor and the temperature of the temperature measurement substrate measured with a thermal camera.

In the prior technology, Korean Laid-Open Patent Publication No. 10-2015-0129937 Method and System for Determining Object Health Status', the blackbody is set to a predetermined temperature, the blackbody and the face are simultaneously photographed with a thermal camera, and temperature calibration is performed using the difference between the measured temperature of the blackbody in the thermal image and the preset temperature of the blackbody. When the blackbody is set to a predetermined temperature, it is expensive to maintain the temperature by applying as much heat as the above temperature. In Korean Laid-Open Patent Publication No. 10-2015-0129937, two blackbody sources are used, and the unit cost of the system including them becomes considerably expensive and it is also bulky. Unlike the laboratory environment, where the blackbody source is not in a laboratory environment, but in a general environment, there are many variables that can be factors of error, such as changes in temperature, changes in humidity, the presence of wind, and the presence of disrupting infrared rays, and these are also significant problems in the management of the equipment, so it can affect the accuracy of the system of Korean Laid-Open Patent Publication No. 10-2015-0129937 using it, and these are also significant problems in the management of the system.

DETAILED DESCRIPTION OF THE INVENTION

Technical Issue to Be Addressed

The problem that the present aims to solve is as follows. The present invention calibrates the temperature of a thermal camera using an externally mounted temperature calibration device being mounted on one side of the outside of the thermal camera unit and including a temperature measurement substrate equipped with a temperature sensor without using a blackbody source (blackbody furnace). The temperature measurement substrate of the externally mounted temperature calibration device is taken simultaneously with the subject to be measured on the screen of the thermal camera. It utilizes an externally mounted temperature calibration device for improving the temperature accuracy of a thermal camera that calibrates the temperature of a subject to be measured by a thermal camera using the temperature of the temperature measurement substrate measured with a temperature sensor and the temperature of the temperature measurement substrate measured with a thermal camera, and a temperature measurement system using the same.

Technical Means to Address the Issue

In order to solve the above problem, the present invention comprises: a thermal camera unit for measuring the temperature of subject to be measured equipped with a thermal camera, and an externally mounted temperature calibration device including a temperature measurement substrate, which is located outside the thermal camera unit so that the subject to be measured is photographed with the thermal camera, and the externally mounted temperature calibration device is characterized in that it is fixed and mounted on one side of the thermal camera unit.

The temperature sensor is mounted on the opposite side of the side facing the thermal camera unit on the temperature measurement substrate. From the image of the temperature measurement substrate taken together when the subject to be measured is photographed, the operation processing unit detects the temperature of the temperature measurement substrate measured by the thermal camera. Based on the difference between the temperature of the temperature measurement substrate taken by the thermal camera and the temperature of the temperature measurement substrate detected by the temperature sensor, the operation processing unit calibrates the thermal image including the subject to be measured taken by the thermal camera.

The temperature measurement substrate is formed by coating copper plates on both sides of the printed circuit board substrate, connecting both sides of the printed circuit board substrate using copper contacts, and coating the surface of the printed circuit board with a matte black paint. When calibrating a thermal image including a subject to be measured taken by the thermal camera, in the thermal image including the subject to be measured taken by the thermal camera, The operation processing unit performs calibration by doing that the difference between the temperature of the temperature measurement substrate detected by the thermal camera and the temperature of the temperature measurement substrate detected by the temperature sensor is subtracted.

The housing unit of the temperature calibration device is mounted on one side of the thermal camera unit, and the temperature calibration device control unit is located inside the housing unit of the temperature calibration device to detect the temperature from the temperature sensor and transmit it to the operation processing unit. A temperature measurement substrate is mounted on one side of the temperature calibration device control unit, and the temperature measurement substrate is mounted vertically to the temperature calibration device control unit while facing the thermal camera unit.

On one side of the temperature measurement substrate, a connector is located at the lower part and a temperature sensor is located at the upper part. The connector is coupled with a connector coupling unit provided on one side of the temperature calibration device control unit, and it is configured to mount a temperature measurement substrate on the temperature calibration device control unit and supply power to the temperature sensor through the temperature calibration device control unit.

The operation method of the temperature measurement system, includes a signal measurement step, an uncompensated image data storage step, an image data detection step of the temperature measurement substrate, a step of temperature detection by the temperature sensor, and a step of temperature detection of the temperature measurement substrate by the thermal camera. In the signal measurement step, the image that is photographed by a thermal camera and includes the temperature measurement substrate and the subject to be measured, is transmitted to the operation processing unit, and the temperature of the temperature measurement substrate measured by the temperature sensor that is mounted on a surface other than the surface facing the thermal camera unit in the temperature measurement substrate, is transmitted to the operation processing unit. In the uncompensated image data storage step (storage step of image data before compensation), the operation processing unit temporarily stores the image which photographed by a thermal camera in the signal measurement step and which included the temperature measurement substrate and the subject to be measured, in the memory unit, as image data (uncompensated image data) before compensation. In the image data detection step of the temperature measurement substrate, the operation processing unit detects image data of the temperature measurement substrate from the image data before compensation, and temporarily stores it in the memory unit. In the step of temperature detection by the temperature sensor, the operation processor detects the temperature at the same time point as the temperature data of the image data detection step of the temperature measurement substrate, from the temperatures detected through the temperature sensor in the signal measurement step, and stores it temporarily in the memory unit as the temperature value of the temperature measurement substrate measured by a temperature sensor. In the step of temperature detection of the temperature measurement substrate by the thermal camera, the operation processing unit detects the temperature of the temperature measurement substrate, namely, the temperature of the temperature measurement substrate measured by the thermal camera, from the image data of the temperature measurement substrate extracted in the image data detection step of the temperature measurement substrate.

In the process of calibration of the image data before compensation in the temperature detection step by the temperature sensor, the difference between the temperature value of the temperature measurement substrate detected by the temperature sensor and the temperature value of the temperature measurement substrate detected by the thermal camera is obtained as the compensation value, and it is corrected by subtracting the compensation value from the image data before compensation in the image data storage step prior to compensation.

The temperature of the temperature measurement substrate obtained from the thermal camera in the temperature detection step of the temperature measurement substrate by the thermal camera is the average of the temperature data of the temperature measurement substrate.

In the temperature measurement system, an externally mounted temperature calibration device is mounted on the thermal camera so that a portion of the temperature measurement substrate enters the field of view of the thermal camera lens, and part of the temperature measurement substrate is placed on one side of the thermal camera's image screen.

In addition, the present invention is characterized by the externally mounted temperature calibration device provided in the temperature measurement system.

Effects of the Invention

The externally mounted temperature calibration device of the present invention and a temperature measurement system using the same calibrate the temperature of a thermal camera using an externally mounted temperature calibration device including a temperature measurement substrate equipped with a temperature sensor without using a blackbody source (namely, blackbody furnace). The temperature measurement substrate of the externally mounted temperature calibration device is imaged simultaneously with the subject to be measured on the screen of the thermal camera, and the temperature of the subject measured by the thermal camera is calibrated using the temperature of the temperature measurement substrate measured by the temperature sensor and the temperature of the temperature measurement substrate measured by the thermal camera, which ensures that the thermal camera always maintains constant temperature measurement results regardless of the temperature of the surrounding environment when used. In addition, by not using expensive blackbody sources, the unit price is low and the equipment is not bulky. In particular, in a general environment in which the blackbody source is actually used rather than a laboratory environment, there are many variables that can be factors of error, such as temperature change, humidity change, wind, and the presence of disruptive infrared rays, unlike in the laboratory environment, and these pose significant problems in terms of management also. The present invention is less likely to cause errors than a system using a blackbody source in a general environment, and therefore, it can be said that its accuracy is relatively high, and the management of the system is relatively easy.

SPECIFIC DETAILS FOR IMPLEMENTATION OF THE INVENTION

Figure 1:
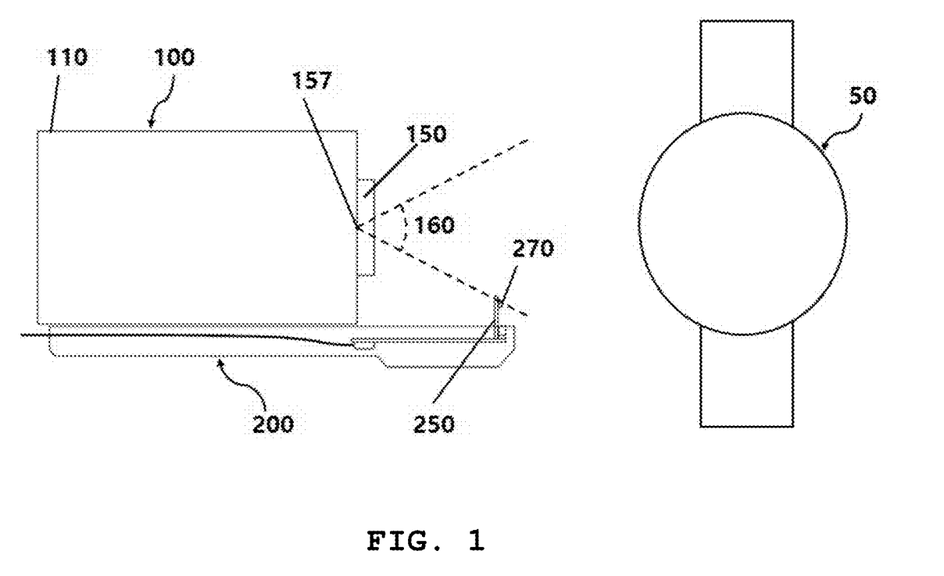
FIG. 1 is an explanatory diagram schematically illustrating an externally mounted temperature calibration device (200) for improving the temperature accuracy of the thermal camera of the present invention and a temperature measurement system (10) using the same.

An externally mounted temperature calibration device for improving the temperature accuracy of a thermal camera of the present invention and a temperature measuring system using the same are described in detail below with reference to the accompanying drawings. FIG. 1 is an explanatory diagram schematically illustrating an externally mounted temperature calibration device (200) for improving temperature accuracy of the thermal camera of the present invention and a temperature measurement system (10) using the same.

An externally mounted temperature calibration device (200) is mounted on one side of the thermal camera unit (100). The externally mounted temperature calibration device (200) includes a temperature measurement substrate (210) including an image capture part (250) for temperature calibration and a temperature sensor (270). When the subject to be measured (object, specimen) (50) is photographed with the thermal camera unit (100), the image capture part (250) for temperature calibration of the temperature measurement substrate (210) is simultaneously photographed. In this way, the measured temperature of the temperature measurement substrate (210) and the temperature of the subject to be measured (50) are transmitted to the operation processing unit (170). In addition, the temperature sensor (270) of the temperature measurement substrate (210) detects the surface temperature of the temperature measurement substrate (210) and transmits it to the operation processing unit (170).

The operation processing unit 170 calibrates the temperature of the subject to be measured (50) using the difference between the surface temperature of the temperature measurement substrate (210) measured through the temperature sensor (270) and the temperature of the temperature measurement substrate (210) measured through the thermal camera unit (100). Here, the operation processing unit (170) may be in the form of a microprocessor, a microcontroller, or a computer, and may be equipped inside or outside the thermal camera unit (100). In general, temperature calibration of a thermal camera consists of adjusting the gain and level of the image sensor. Of these, it is the level that changes depending on the temperature of the surrounding environment, and at this time, the gain hardly changes and is within a reliable level.

Conventionally, a blackbody source is installed at a certain distance from the thermal camera, that is, a blackbody source is placed outside the thermal camera and the temperature is compensated based on it, and this means that the level is adjusted. The blackbody source is set to a predetermined temperature and the blackbody source is heated to the predetermined temperature and maintains the predetermined temperature, and the subject to be measured is captured together with the blackbody source at the same time by the thermal camera. The temperature of the subject to be measured is calibrated using the temperature of the blackbody source obtained through the thermal camera and the set temperature of the blackbody source.

On the other hand, in the present invention, instead of using an expensive blackbody source, an inexpensive external temperature calibration device (200) including a temperature measurement substrate (210) with a temperature sensor is used. The temperature measurement substrate (210) is photographed simultaneously with the subject to be measured on the screen of the thermal camera (101), and the temperature of the temperature measurement substrate (210) is measured with the temperature sensor 270. Using the temperature of the temperature measurement substrate obtained through the temperature sensor (270) and the temperature of the temperature measurement substrate obtained through the thermal camera, the temperature of the subject to be measured is calibrated.

In addition, in the present invention, since the external temperature calibration device is mounted on one side of the thermal camera and is integrated, as in previous technology, it is possible to bypass the trouble of separately installing a blackbody source as it is separated from the thermal camera by a certain distance.

In general, for a blackbody source, the temperature value can be set in units of 0.1° C., and it is a calibration device devised to always maintain this temperature. But it is very difficult to maintain the temperature of a surface exposed to the outside temperature constant.

However, because the question of what degree to set the temperature of a blackbody source has not been specifically determined, if it is possible to know what degree the surface temperature of the current blackbody source is, it is a basis for temperature compensation based on the actual surface temperature even if it is different from the set value. In other words, if there is an object for which it is possible to accurately determine the current surface temperature, and its emissivity is close to 1, it can be used as a standard for temperature calibration. The present invention was conceived in this regard.

Figure 2:
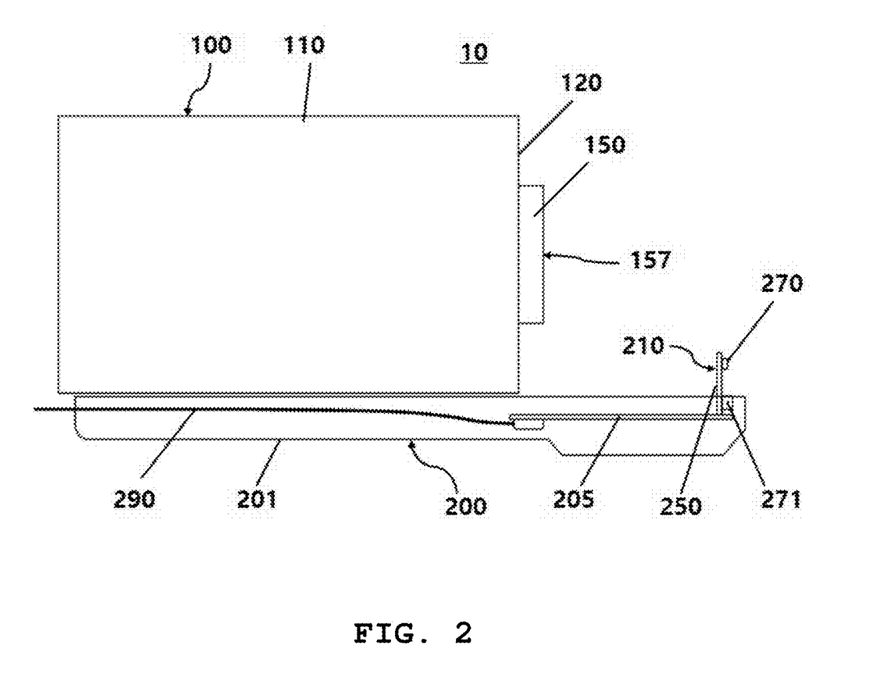
FIG. 2 is an explanatory diagram schematically illustrating the configuration of the externally mounted temperature calibration device (200) of the present invention and a temperature measurement system (10) using the same
Figure 3:
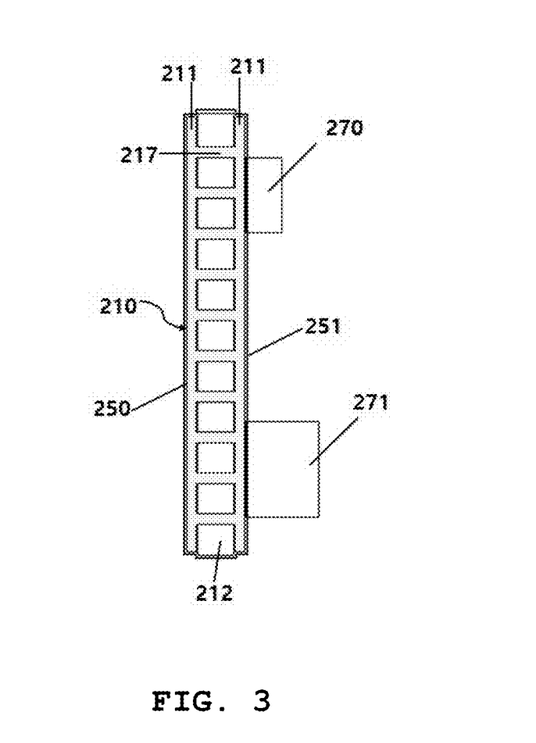
FIG. 3 is an explanatory diagram explaining the configuration of the temperature measurement substrate (210) of FIG. 2.
Figure 4:
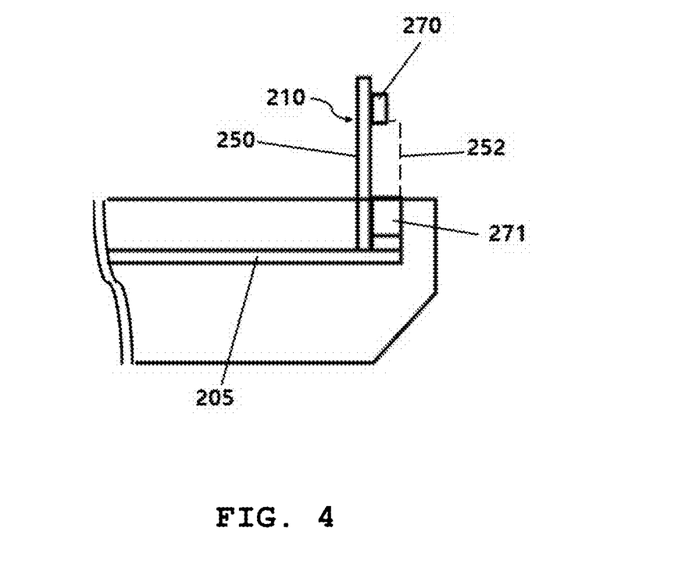
FIG. 4 is an enlarged view of a part of the externally mounted temperature calibration device (200) in FIG. 2.
Figure 5:
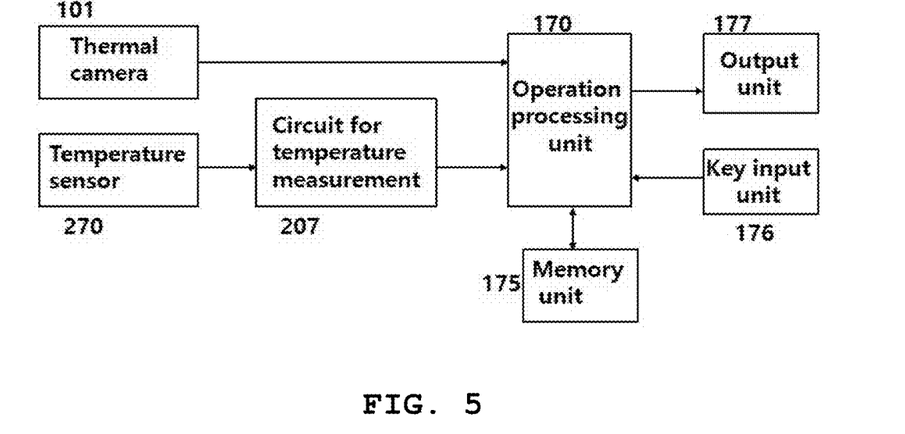
FIG. 5 is a block diagram schematically illustrating the operation of the temperature measurement system (10).

FIG. 2 is an explanatory diagram schematically illustrating the configuration of the externally mounted temperature calibration device (200) of the present invention and a temperature measurement system (10) using the same. FIG. 3 is an explanatory diagram explaining the composition of the temperature measurement substrate (210) of FIG. 2. FIG. 4 is an enlarged view of a part of the externally mounted temperature calibration device (200) in FIG. 2. FIG. 5 is a block diagram schematically illustrating the operation of the temperature measurement system (10).

As shown in FIG. 2, the temperature measurement system (10) of the present invention includes an externally mounted temperature calibration device (200) and a thermal camera unit (100). In other words, an externally mounted temperature calibration device (200) is included on one side of the thermal camera unit (100).

The thermal camera unit (100) has a thermal camera (101) built into the thermal camera housing unit (110). The lens (157) of the thermal camera is exposed at the center of the front surface (120) of the thermal camera unit (100). A cylindrical lens adjustment unit (150) surrounding the lens (157) of the thermal camera is provided on the front surface (120) of the thermal camera unit (100). Here, a commercially available thermal camera may be used for the thermal camera unit (100).

The externally mounted temperature calibration device (200) is mounted and fixed to one side of the thermal camera unit (100), and includes a temperature measurement substrate (210).

A temperature calibration device housing unit (200) is mounted on one side of the thermal camera unit (100), and a temperature calibration device control unit (205) is located inside the temperature calibration device housing unit (200). On one side of the temperature calibration device control unit (205), a temperature measurement substrate (210) faces the thermal camera unit (100), and it is mounted perpendicularly to the temperature calibration device control unit (205). When the temperature calibration device control unit (205) and the temperature measurement substrate (210) are combined, the connector unit (271) of the temperature measurement substrate (210) and the connector coupling unit (not shown) of the temperature calibration device control unit (205) are combined. Accordingly, the temperature measurement substrate (210) may be mounted on the temperature calibration device control unit (205), and in addition, power is supplied to the temperature sensor (270) to measure the temperature of the temperature measurement substrate (210). Here, the connector coupling unit (not shown) of the temperature calibration device control unit (205) may have a slot shape.

The housing unit of the temperature calibration device (200) surrounds the temperature calibration device control unit (205) and supports the temperature measurement substrate (210) so that the temperature measurement substrate (210) is photographed together with the thermal camera unit (100).

The temperature calibration device control unit (205) detects the temperature measured from the temperature sensor (270) mounted on the temperature measurement substrate (210), performs pre-processing such as filtering, etc., and transmits the detected temperature to the operation processing unit (170) either through a wired (290) or wireless connection.

As shown in FIG. 4, one surface of the temperature measurement substrate (210) (front of temperature measurement substrate (210)), that is, the part (surface) facing the lens (157) of the thermal camera unit (100) in the temperature measurement substrate (210), is the image capture part (250) for temperature calibration. A temperature sensor (270) is mounted on the other side (rear of the temperature measurement substrate (210)) of the temperature measurement substrate (210), that is, on one side opposite to the image capture part (250) for temperature calibration in the temperature measurement substrate (210).

The lens (157) of the thermal camera has a constant angle of view (160) and the end of the temperature measurement substrate (210) is positioned on one side of the screen. The temperature of the temperature measurement substrate (210) is measured by the temperature sensor (270), and this value is finally transmitted by the transmission cable (290). Calibration is performed by compensating the temperature value of the circuit board measured by the thermal camera (101) based on the temperature value transmitted in this way, and the calibration interval can be adjusted as needed.

In other words, as shown in FIG. 5, the temperature measurement substrate (210) is photographed simultaneously with the subject to be measured on the screen of the thermal camera (101), and the temperature of the temperature measurement substrate (210) is measured with the temperature sensor (270). Accordingly, the temperature of the temperature measurement substrate and the temperature of the subject to be measured obtained through the thermal camera (101) are transmitted to the operation processing unit (170). In addition, the temperature signal of the temperature measurement substrate (210) is detected by the temperature measurement circuit from the signal output from the temperature sensor (270) and transmitted to the operation processing unit (170). The temperature detected by the temperature measurement circuit is hereinafter referred to as the 'temperature of the temperature measurement substrate (210) obtained through the temperature sensor (270)'.

The operation processing unit (170) subtracts the temperature of the temperature measurement substrate obtained through the thermal camera (101) from the temperature of the temperature measurement substrate (210) obtained through the temperature sensor (270), and the difference between the temperature of the temperature measurement substrate (210) obtained through the temperature sensor (270) and the temperature measurement substrate obtained through the thermal camera (101) is obtained. By subtracting the difference from the temperature of the subject to be measured, the temperature of the subject to be measured is calibrated.

As in FIG. 3, the temperature measurement substrate (210) coats copper (211) on both sides of the printed circuit board substrate (212), and connects them to several fine copper contacts (217) so that the temperatures of both sides, that is, the two plates, are the same. Furthermore, the surface of the circuit board is formed a coating layer (251) with a matte black (paint) so that the emissivity is close to 1. The temperature sensor (270) is attached to the surface of the temperature measurement substrate (210) that is not viewed by the thermal camera, among both sides of it. The accuracy of the temperature sensor (270) is ±0.1° C. or less, and it is preferable that the temperature data can be transmitted to the control circuit more than 50 times. Instead of a printed circuit board substrate, a resin substrate in which glass fiber and epoxy plastic are bonded, or a substrate made of epoxy plastic may be used The temperature measurement substrate (210) is operated by receiving power from the temperature calibration device control unit (205) through the connector (271) to output a temperature value and transmit and receive other communications.

Another aspect of the temperature measurement substrate (210), that is, in the temperature measurement substrate (210), a cover (252) may be further provided to cover parts other than the temperature sensor (270) and the connector (271) on one side of the opposite side from the image capture part (250) for temperature calibration.

Figure 6:
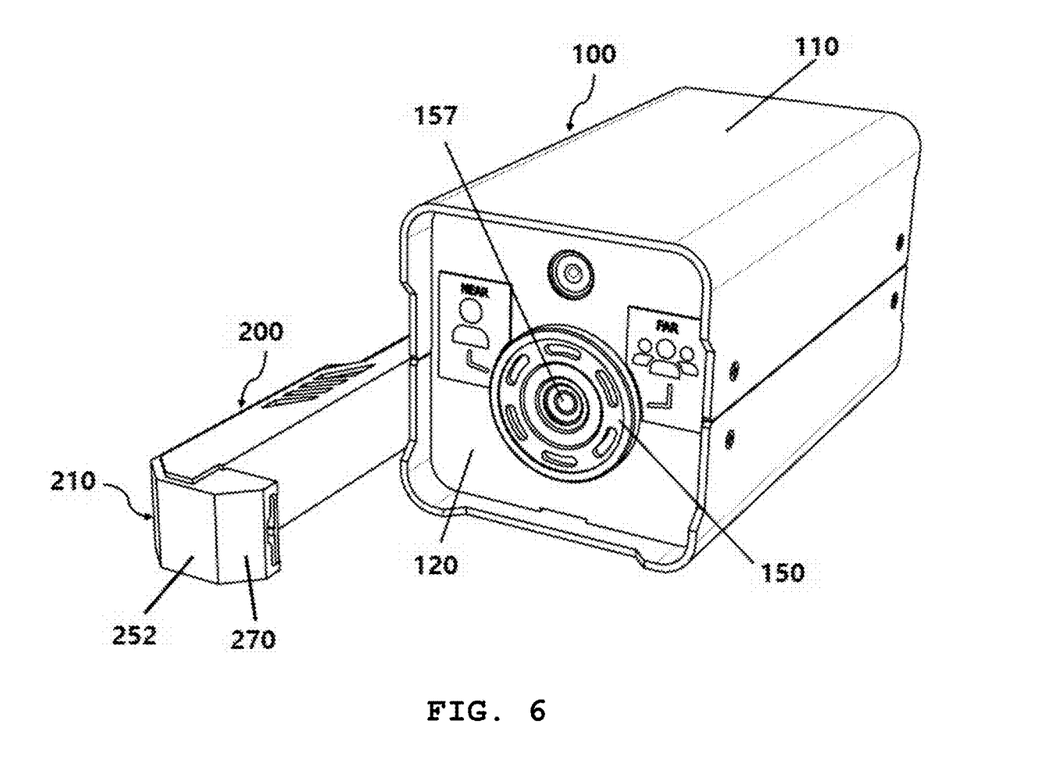
FIG. 6 is a front perspective view of an example of a temperature measurement system (10) including an externally mounted temperature calibration device (200) of the present invention.
Figure 7:
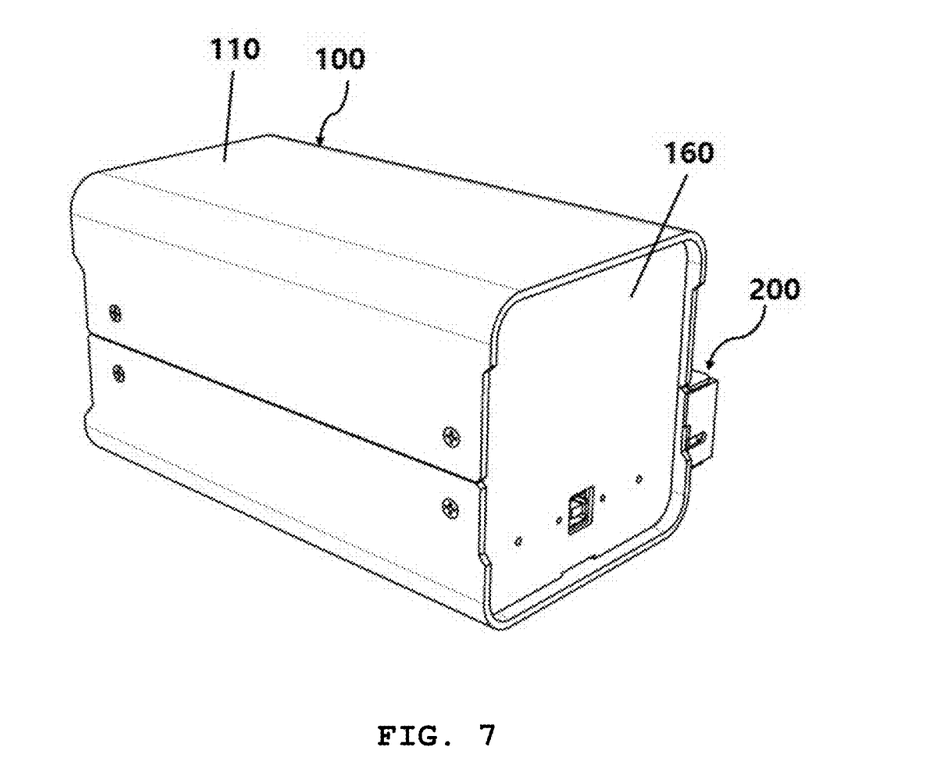
FIG. 7 is a rear perspective view of the temperature measurement system (10) of FIG. 6.
Figure 8:
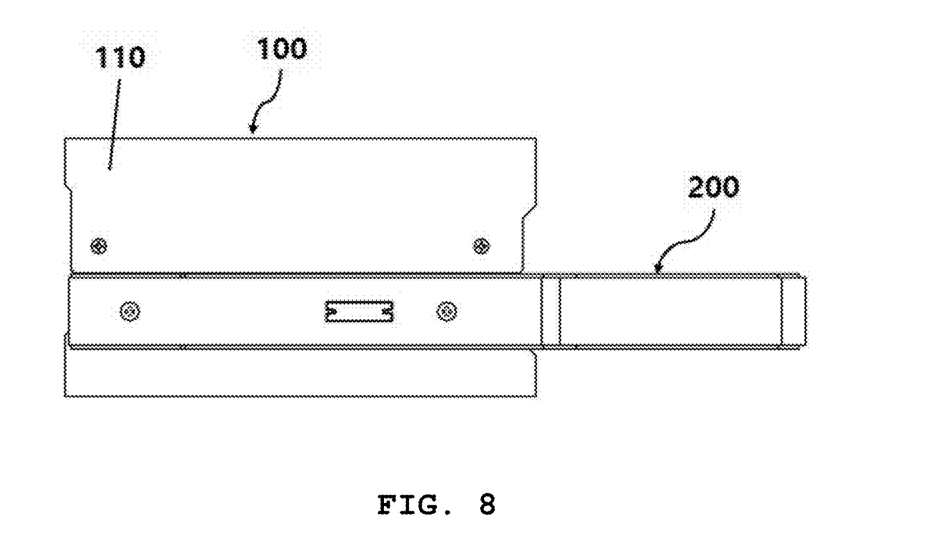
FIG. 8 is a right side view of the temperature measuring system (10) of FIG. 6.
Figure 9:
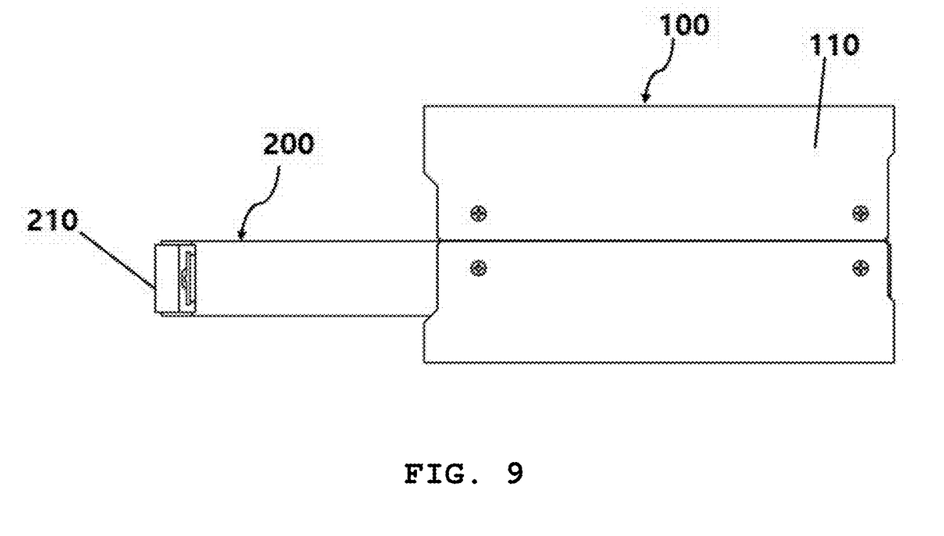
FIG. 9 is a left side view of the temperature measurement system (10) of FIG. 6.
Figure 10:
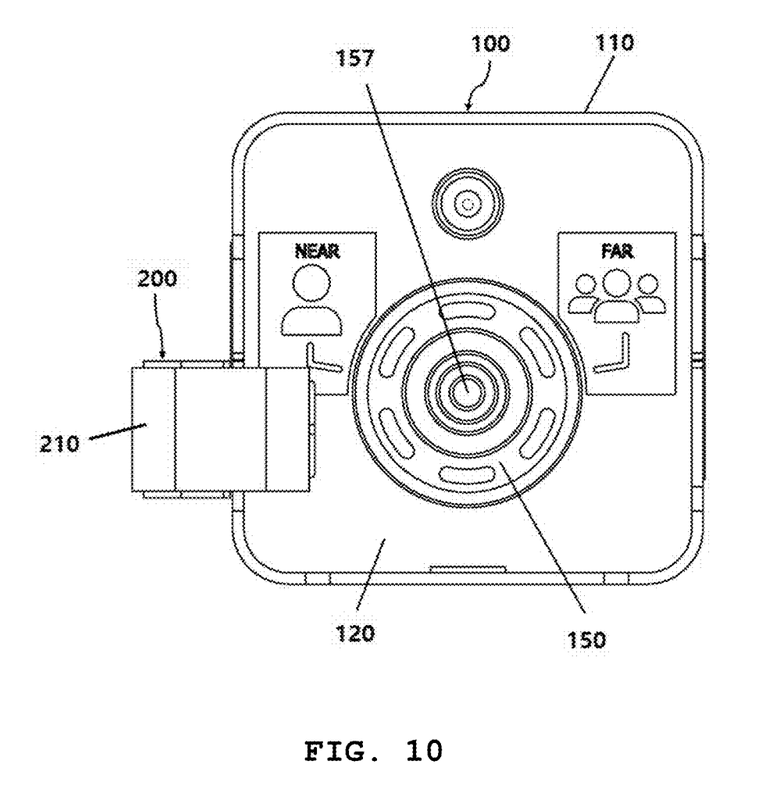
FIG. 10 is a front view of the temperature measuring system (10) of FIG. 6.
Figure 11:
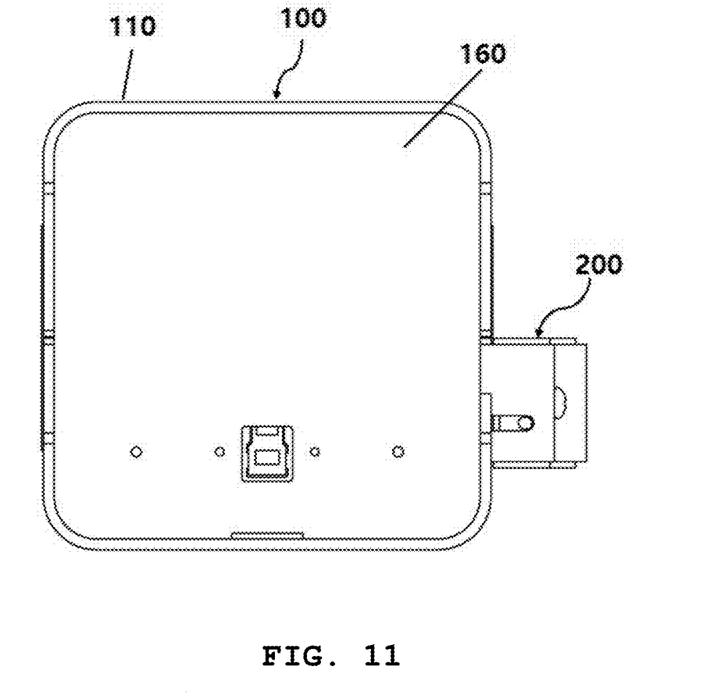
FIG. 11 is a rear view of the temperature measuring system (10) of FIG. 6.
Figure 12:
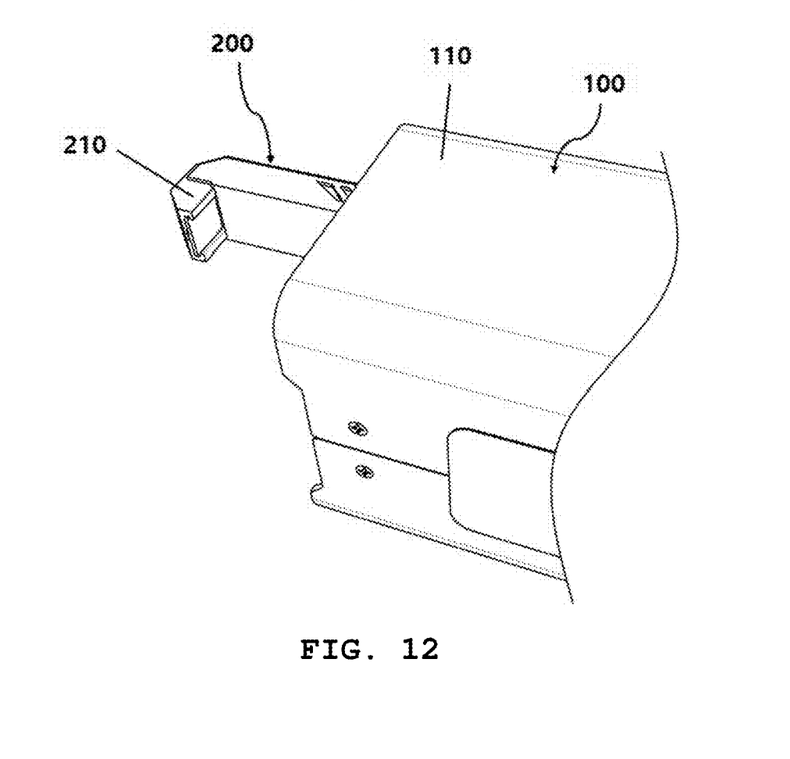
FIG. 12 and FIG. 13 are diagrams for showing the imaging unit (250) for temperature calibration in the temperature measurement substrate (210).
Figure 13:
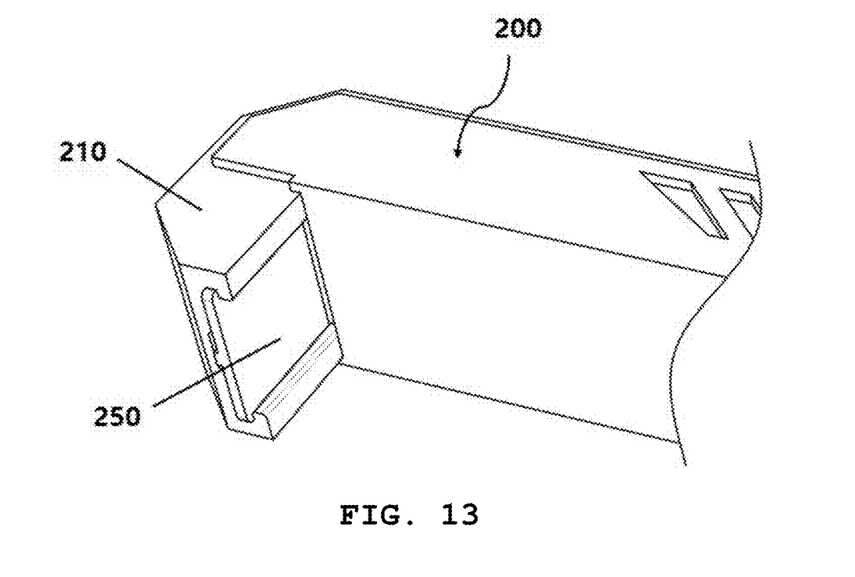
Figure 14:
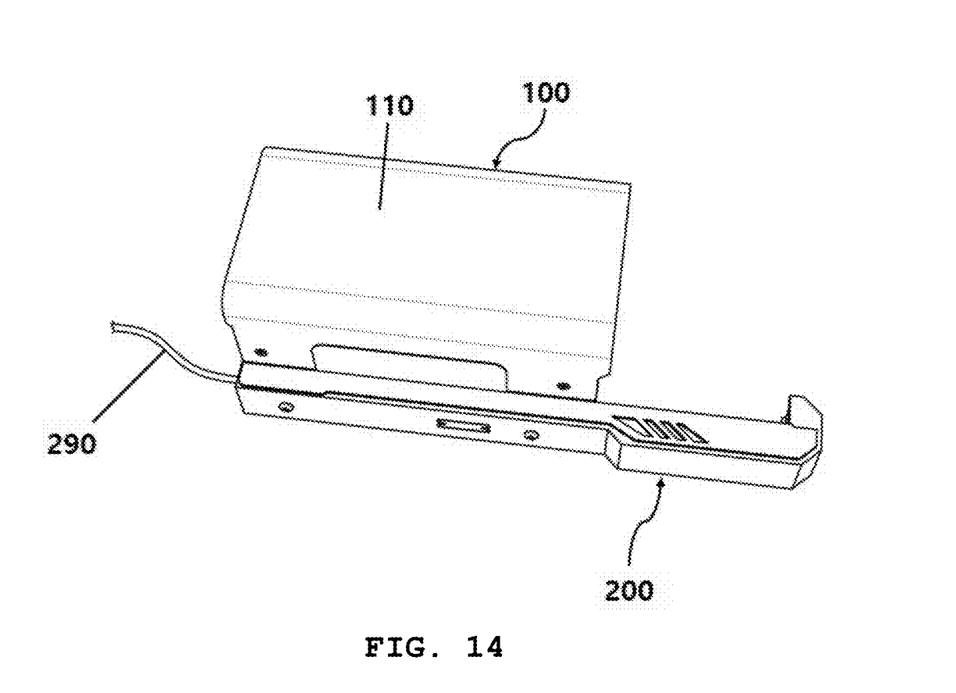
FIG. 14 illustrates a perspective view of the temperature measuring system (10) of FIG. 6 with the transmission cable (290).
Figure 15:
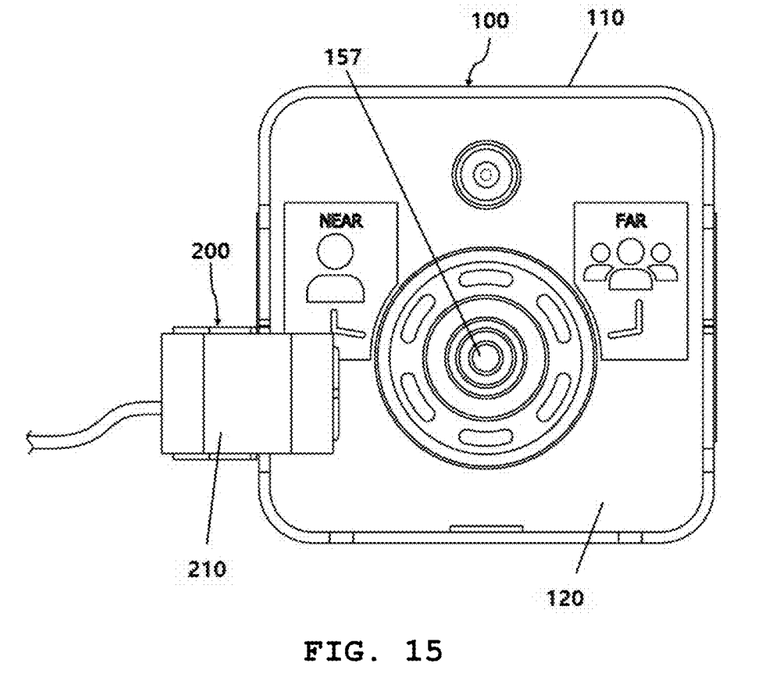
FIG. 15 illustrates a front view of the temperature measuring system (10) of FIG. 6 with the transmission cable (290).
Figure 16:
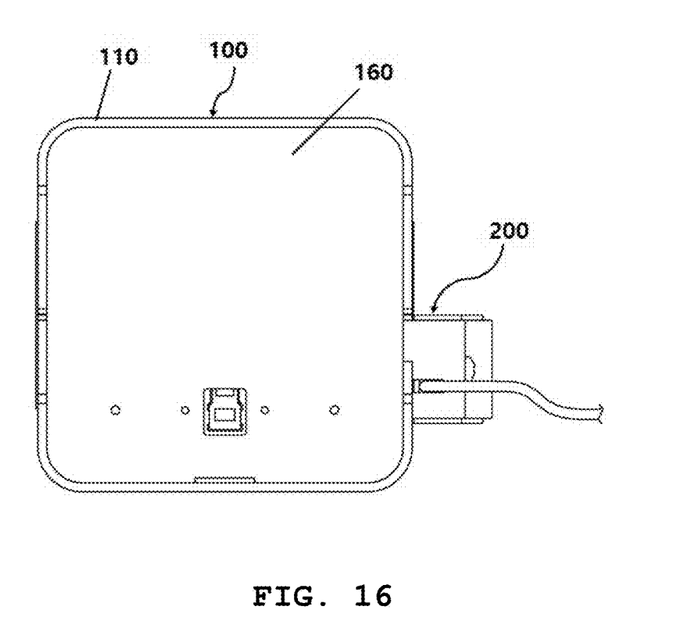
FIG. 16 illustrates a rear view of the temperature measuring system (10) of FIG. 6 with the transmission cable (290).

FIG. 6 is a front perspective view of an example of the temperature measurement system (10) including an externally mounted temperature calibration device (200) of the present invention. FIG. 7 is a rear view of the temperature measuring system (10) of FIG. 6. FIG. 8 is a right side view of the temperature measuring system (10) of FIG. 6. FIG. 9 is a left side view of the temperature measurement system (10) of FIG. 6. FIG. 10 is a front view of the temperature measurement system (10) of FIG. 6. FIG. 11 is a rear view of the temperature measuring system (10) of FIG. 6. FIG. 12 and FIG. 13 are diagrams for showing the imaging unit (250)

for temperature calibration in the temperature measurement substrate (210). FIG. 14 illustrates a perspective view of the temperature measuring system (10) of FIG. 6 with the transmission cable (290). FIG. 15 illustrates a front view of the temperature measuring system (10) of FIG. 6 with the transmission cable (290). FIG. 16 illustrates a rear view of the temperature measuring system (10) of FIG. 6 with the transmission cable (290).

In FIGS. 6 to 13, the externally mounted temperature calibration device (200) is mounted on one side of the thermal camera unit (100) as in the description of FIGS. 1 to 5 above, and the externally mounted temperature calibration device (200) includes a temperature measurement substrate (210) equipped with an image capture part (250) for temperature calibration and a temperature sensor (270). When photographing a subject to be measured (subject, specimen) 50 with the thermal camera unit (100), the image capture part (250) for temperature calibration of the temperature measurement substrate (210) is simultaneously photographed, and the temperature sensor (270) of the temperature measurement substrate (210) detects the surface temperature of the temperature measurement substrate (210).

The temperature of the temperature measurement substrate (210) and the temperature of the subject to be measured (50) measured in this way are transmitted to the operation processing unit (170). The temperature sensor (270) of the temperature measurement substrate (210) detects the surface temperature of the temperature measurement substrate (210) and transmits it to the operation processing unit (170). Using the difference between the surface temperature of the temperature measurement substrate (210) measured through the temperature sensor (270) and the temperature of the temperature measurement substrate (210) measured through the thermal camera unit (100), the operation processing unit (170) calibrates the temperature of the subject to be measured (50) through the thermal camera unit (100).

Figure 17:
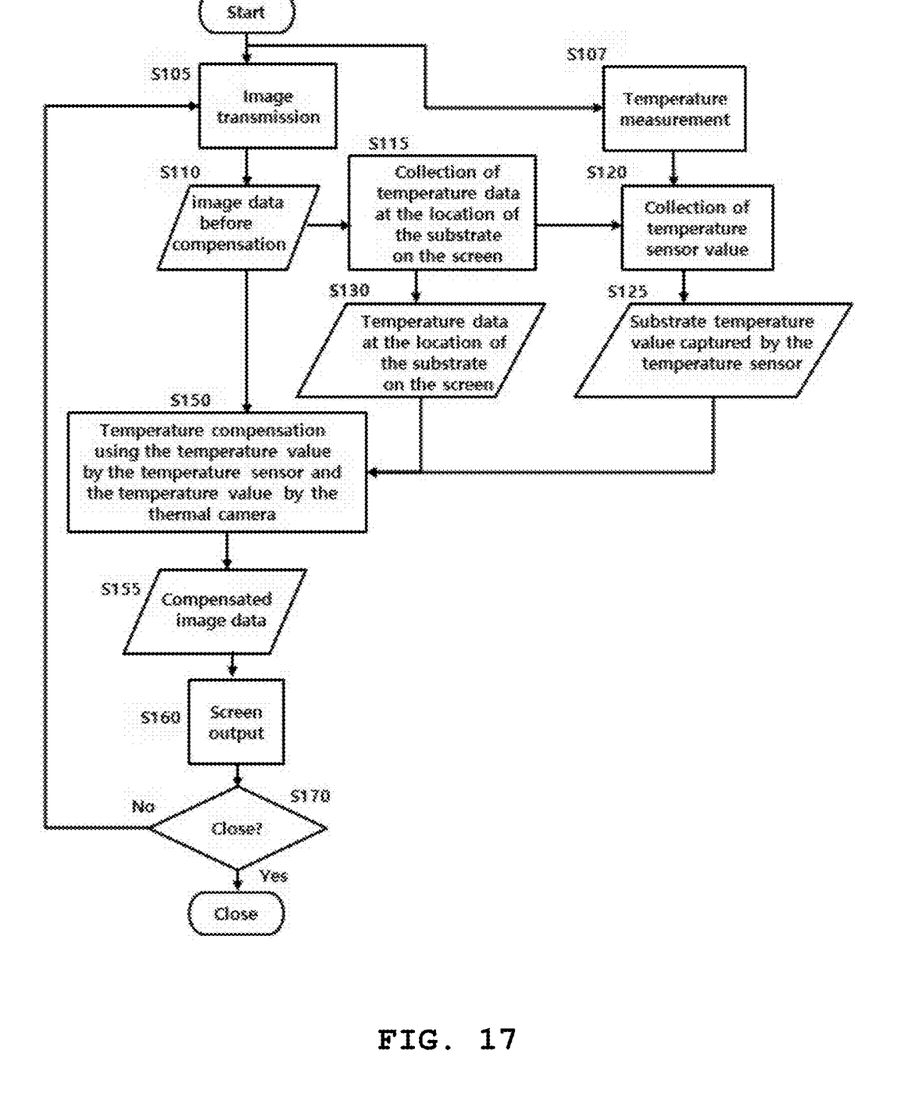
FIG. 17 is a flow chart schematically explaining the method of performing temperature calibration in the temperature measurement system (10) of the present invention.

FIG. 17 is a flow chart schematically explaining the method of performing temperature calibration in the temperature measurement system (10) of the present invention. In the signal measurement step, when the temperature measurement starts in the temperature measurement system (10), the images of the temperature measurement substrate (210) and the subject to be measured (50) captured by the thermal camera (101) are transmitted to the operation processing unit (170) (S105), and at the same time, the externally mounted temperature calibration device (200) is driven and the temperature of the temperature measurement substrate (210) measured by the temperature sensor (270) is transmitted to the operation processing unit (170) (S107).

In the uncompensated image data storage step (storage step of image data before compensation), the operation processing unit temporarily stores the image which photographed by a thermal camera in the signal measurement step and which included the temperature measurement substrate and the subject to be measured, in the memory unit, as image data (uncompensated image data) before compensation (S110). The image of the thermal camera (101) indicates the degree of temperature (heat), where the image data of the thermal camera (101) is temperature data of the thermal camera (101).

As the image data detection step of the temperature measurement substrate, the operation processing unit (170) extracts (detects) the image data (temperature data) of the position (part) of the temperature measurement substrate (210) from the image data before compensation, that is, the image data of the corresponding part of the temperature sensor part of the temperature measurement substrate (210) in the image data before compensation (temperature data) and temporarily saves it in the memory unit (175) (S115).

In the step of temperature detection by the temperature sensor, from the temperatures detected by the temperature sensor (S120), the operation processing unit (170) extracts the temperature from the same time point as the temperature data of the image data detection step of the position of the temperature measurement substrate, and it is temporarily stored in the memory unit (175) (S125).

In the step of temperature detection by the temperature sensor, the operation processing unit (170) detects the temperature of the position of the temperature measurement substrate (210) from the image data of the position of the temperature measurement substrate (210) detected in image data detection step of the temperature measurement substrate. This detected the temperature of the position of the temperature measurement substrate (210) is the temperature of the temperature measurement substrate by thermal camera. Here, the temperature of the temperature measurement substrate obtained from the thermal camera can be obtained as an average value of the temperature data of the position of the temperature measurement substrate (210).

Next step is the temperature calibration step. Using the temperature value of the temperature measurement substrate measured by the temperature sensor obtained in the temperature detection step by the temperature sensor and the temperature value of the temperature measurement substrate measured by the thermal camera obtained in the temperature detection step of the temperature measurement substrate measured by the thermal camera, the image data before compensation (that is, the temperature of the subject to be measured by the thermal camera) saved in the saving step of image data before compensation is compensated (S150), and the compensated image data is temporarily saved in the memory unit (175) (S155).

The operation processing unit obtains the difference between The temperature value of the temperature measurement substrate measured by the temperature sensor obtained in the temperature detection step by the temperature sensor and the temperature measurement substrate measured by the thermal camera obtained in the temperature detection step of the temperature measurement substrate measured by the thermal camera, as a compensation value. Then the operation processing unit calibrates by subtracting the compensation value from the image data before compensation.

Here, the temperature of the temperature measurement substrate measured by the thermal camera can be said to have been detected using a non-contact method, and the temperature of the temperature measurement substrate measured by the temperature sensor can be said to have been detected using a contact method. The temperature sensor is a contact-type temperature sensor.

As the output step of the temperature calibrated image, the calibrated image data saved in the memory unit (175) in the temperature calibration step is output to the output unit (177) (S160). Here, the output unit (177) may be a display unit or an image printer.

As the step of determining whether to end, the end signal is received through the key input unit (176), or if the number of image data before compensation is the total number previously set or if it exceeds a predetermined time after starting the operation of the temperature measurement system (10), the operation of the temperature measurement system (10) is ended, and if not, the process returns to the signal measurement step (S170).

In the present invention, the difference between the temperature value by the temperature sensor (that is, a precise contact temperature sensor) and the temperature value at the position of the temperature sensor on the substrate for temperature measurement on the screen is obtained as a compensation value. The entire image obtained by the thermal camera is compensated using the compensation value.

In the present specification, details related to the present invention that can be sufficiently recognized and inferred by any person of ordinary knowledge in the technical field are omitted, and in addition to the specific examples described in the present specification, more various modifications are possible within the scope of not changing the technical idea or essential configuration of the present invention. Therefore, the present invention may be implemented in a manner different from that specifically described and illustrated in the present specification, which can be understood by those of ordinary skill in the technical field of the present invention.

What is claimed is:

1. A temperature measuring system comprising:
    a thermal camera unit for measuring a temperature of a subject to be measured, the thermal camera unit being equipped with a thermal camera; and
    an externally mounted temperature calibration device that is located outside the thermal camera unit and includes a temperature measurement substrate which is photographed with the subject by a thermal camera when photographing the subject;
    wherein the externally mounted temperature calibration device is fixed and mounted on one side of the thermal camera unit;
    wherein the temperature measurement substrate is formed by coating copper plates on both sides of a printed circuit board substrate, and both sides of the printed circuit board substrate are connected using copper contacts;
    wherein
        a temperature sensor is mounted on an opposite side of a side facing the thermal camera unit on the temperature measurement substrate,
        an operation processing unit detects a temperature of the temperature measurement substrate measured by the thermal camera from a thermal image of the temperature measurement substrate photographed with the subject when photographing the subject, and
        the operation processing unit calibrates the thermal image, using a difference between the temperature of the temperature measurement substrate measured by the thermal camera and a temperature of the temperature measurement substrate measured by the temperature sensor; and
    wherein when calibrating the thermal image including the subject to be measured photographed with the thermal camera, in the thermal image including the subject to be measured photographed by the thermal camera, the operation processing unit subtracts the difference in the temperature of the temperature measurement substrate detected by the thermal camera and the temperature of the temperature measurement substrate detected by the temperature sensor from the temperature of the subject to be measured.

2. The temperature measuring system according to claim 1, wherein an externally mounted temperature calibration device is mounted on the thermal camera so that the temperature measurement substrate enters a field of view of a lens of the thermal camera, and a part of the temperature measurement substrate is placed on one side of an image screen of the thermal camera.

3. An externally mounted temperature calibration device according to claim 1.

4. An externally mounted temperature calibration device according to claim 1.

5. An externally mounted temperature calibration device according to claim 1.

6. The temperature measuring system according to claim 1, wherein a surface of the printed circuit board is coated with a matte black paint.

7. An externally mounted temperature calibration device according to claim 6.

8. The temperature measuring system according to claim 1, wherein
    a housing unit of the temperature calibration device is mounted on one side of the thermal camera unit,
    a temperature calibration device control unit for detecting the temperature from the temperature sensor and transmitting it to the operation processing unit is located inside the housing unit of the temperature calibration device, and
    the temperature measurement substrate is mounted on one side of the temperature calibration device control unit, faces the thermal camera and is perpendicular to the temperature calibration device control unit.

9. An externally mounted temperature calibration device according to claim 8.

10. The temperature measuring system according to claim 8, wherein
    on one side of the temperature measurement substrate, a connector is located at a lower part and the temperature sensor is located at an upper part,
    the connector is coupled with a connector coupling unit located on one side of the temperature calibration device control unit to mount a temperature measurement board to the temperature calibration device control unit, and thereby, power is supplied to the temperature sensor through the temperature calibration device control unit.

11. An externally mounted temperature calibration device according to claim 10.

12. A method for operating a temperature measuring system having
    a thermal camera unit for measuring a temperature of a subject to be measured, the thermal camera unit being equipped with a thermal camera, and
    an externally mounted temperature calibration device that is located outside the thermal camera unit and includes a temperature measurement substrate which is photographed with the subject by a thermal camera when photographing the subject,
    the method comprising:
    a signal measurement step wherein an image that is photographed by the thermal camera and includes the temperature measurement substrate and the subject to be measured, is transmitted to an operation processing unit, and a temperature of the temperature measurement substrate measured by a temperature sensor that is mounted on a surface other than a surface facing the thermal camera unit in the temperature measurement substrate, is transmitted to the operation processing unit;
    an uncompensated image data storage step corresponding to a storage step of image data before compensation wherein the operation processing unit temporarily stores the image which is photographed by the thermal camera in the signal measurement step and which includes the temperature measurement substrate and the subject to be measured, in the memory unit, as uncompensated image data before compensation;

an image data detection step of the temperature measurement substrate wherein the operation processing unit detects image data of the temperature measurement substrate from the uncompensated image data before compensation, and temporarily stores it in the memory unit;

a step of temperature detection by the temperature sensor, wherein the operation processor derives a temperature at a same time point as temperature data of the image data detection step of the temperature measurement substrate, from temperatures detected through the temperature sensor in the signal measurement step, and stores it temporarily in the memory unit as a temperature value of the temperature measurement substrate measured by the temperature sensor; and a step of temperature detection of the temperature measurement substrate by the thermal camera, wherein the operation processing unit detects the temperature of the temperature measurement substrate measured by the thermal camera, from the image data of the temperature measurement substrate detected in the image data detection step of the temperature measurement substrate;

wherein in a temperature correction step, the operation processing unit obtains a difference between the temperature value of the temperature measurement substrate by the temperature sensor and the temperature value of the temperature measurement substrate by the thermal camera, as a compensation value, and performs a correction by subtracting the compensation value from the uncompensated image data before compensation obtained in the uncompensated image data storage step.

13. The method for operating the temperature measuring system according to claim 12, further comprising:

a temperature calibration step wherein the operation processing unit corrects the uncompensated image data before compensation stored in the uncompensated image data storage step, by using the temperature value of the temperature measurement substrate by the temperature sensor obtained in the temperature detection step by the temperature sensor and a temperature value of the temperature measurement substrate by the thermal camera obtained in step of temperature detection of the temperature measurement substrate by thermal camera.

14. The method for operating the temperature measuring system according to claim 12, wherein in the step of temperature detection of the temperature measurement substrate by the thermal camera, the temperature of the temperature measurement substrate obtained from the thermal camera is an average of the temperature data of the temperature measurement substrate.

15. An externally mounted temperature calibration device according to claim 12.

* * * * *